(12) United States Patent
Wilson et al.

(10) Patent No.: US 9,779,478 B1
(45) Date of Patent: Oct. 3, 2017

(54) RENDERING COMPOSITE CONTENT ON A HEAD-MOUNTED DISPLAY INCLUDING A HIGH RESOLUTION INSET

(71) Applicant: Oculus VR, LLC, Menlo Park, CA (US)

(72) Inventors: Austin Wilson, Seattle, WA (US); Douglas Robert Lanman, Bellevue, WA (US); Nicholas Daniel Trail, Bothell, WA (US); Scott Charles McEldowney, Redmond, WA (US); Stephen James McNally, Woodinville, WA (US); Yusufu Njoni Bamaxam Sulai, Bothell, WA (US)

(73) Assignee: Oculus VR, LLC, Menlo Park, CA (US)

(*) Notice: Subject to any disclaimer, the term of this patent is extended or adjusted under 35 U.S.C. 154(b) by 0 days.

(21) Appl. No.: 15/284,898

(22) Filed: Oct. 4, 2016

(51) Int. Cl.
| | | |
|---|---|---|
| G09G 5/00 | (2006.01) | |
| G06T 3/40 | (2006.01) | |
| G06F 3/01 | (2006.01) | |
| G06F 3/0346 | (2013.01) | |
| G06T 7/00 | (2017.01) | |
| G06T 11/00 | (2006.01) | |
| G06T 1/20 | (2006.01) | |

(52) U.S. Cl.
CPC ............ *G06T 3/4092* (2013.01); *G06F 3/012* (2013.01); *G06F 3/013* (2013.01); *G06F 3/0346* (2013.01); *G06T 1/20* (2013.01); *G06T 7/0018* (2013.01); *G06T 11/00* (2013.01)

(58) Field of Classification Search
CPC ......... G06T 3/4092; G06T 11/00; G06T 1/20; G06F 3/013; G06F 3/012; G06F 3/0346
See application file for complete search history.

(56) References Cited

U.S. PATENT DOCUMENTS

| | | | | |
|---|---|---|---|---|
| 5,808,589 A | * | 9/1998 | Fergason | G02B 27/0172 345/8 |
| 8,049,685 B2 | * | 11/2011 | Miller | G09G 3/30 315/169.3 |
| 2012/0154277 A1 | * | 6/2012 | Bar-Zeev | G02B 27/017 345/158 |
| 2016/0062121 A1 | * | 3/2016 | Border | G02B 27/0172 359/630 |

* cited by examiner

*Primary Examiner* — Robert Craddock
(74) *Attorney, Agent, or Firm* — Fenwick & West LLP

(57) ABSTRACT

A head-mounted display (HMD) divides an image into a high resolution (HR) inset portion at a first resolution, a peripheral portion, and a transitional portion. The peripheral portion is downsampled to a second resolution that is less than the first resolution. The transitional portion is blended such that there is a smooth change in resolution that corresponds to a change in resolution between a fovea region and a non-fovea region of a retina. An inset region is generated using the HR inset portion and the blended transitional portion, and a background region is generated using the downsampled peripheral portion. The inset region is provided to a HR inset display, and the background region is provided to a peripheral display. An optics block combines the displayed inset region with the displayed background region to generate composite content.

22 Claims, 11 Drawing Sheets

RENDERING COMPOSITE CONTENT ON A HEAD-MOUNTED DISPLAY INCLUDING A HIGH RESOLUTION INSET

BACKGROUND

The present disclosure generally relates to electronic displays, and specifically relates to a head-mounted compound display including a high resolution inset.

Conventional displays present images at a constant resolution. In contrast, resolution varies across a retina of a human eye. Though the eye receives data from a field of about 200 degrees, the acuity over most of that range is poor. In fact, the light must fall on the fovea to allow perception of high resolution images, and that limits the acute visual angle to about 15 degrees. In head-mounted displays, at any given time, only a small portion of the light emitted from the display is actually imaged onto the fovea. The remaining light that is imaged onto the retina is detected by other areas outside the fovea that are not capable of perceiving the high resolution in the emitted image light. Accordingly, some of the resources (e.g., power, memory, processing time, etc.) that went into generating the high resolution image being viewed by the user is wasted as the user is not able to perceive the portion of the image light imaged outside the fovea at its full resolution.

SUMMARY

A head-mounted display (HMD) generates composite content at retinal resolution. Retinal resolution is defined as a composite image with variable resolution that matches a resolution of a retina of a typical human eye. Composite content is composed of a background region and an inset region that together form an image at retinal resolution. The background region is a portion of an image at a resolution of a non-foveal region of a human eye. The inset region includes a high resolution (HR) portion of the image that is surrounded by a transitional portion of the image. The HR inset portion of the image is at a resolution corresponding to a fovea region of the human eye. The transitional portion is blended such that its resolution smoothly varies between the resolution of the HR inset portion and the resolution of the background region. In alternate embodiments, the HR inset portion of the image is at a resolution higher than the background region, but less than the resolution corresponding to the fovea region of the human eye. The HMD includes a peripheral display and a HR inset display. The peripheral display presents the background region at its resolution, and the HR inset display presents the inset region according to its varying resolution. The HMD combines the light from the two displays such that composite content is formed at retinal resolution.

The HMD includes a controller that generates the background region and the inset region, such that they are seamlessly combined as composite content. The controller divides a received image into a HR inset portion, a peripheral portion, and a transitional portion between the HR inset portion and the peripheral portion. The image is at a first resolution corresponding to a fovea region of a human eye. Alternatively the controller adjusts the resolution of HR inset portion to a target resolution corresponding to a fovea region. The transitional portion has an inner boundary between the transitional portion and the HR inset portion and an outer boundary between the transitional portion and the peripheral portion. The controller downsamples (or retrieves previously coarsely generated data for) the peripheral portion to a second resolution that is less than the first resolution, the second resolution corresponding to a non-fovea region of the human eye. The transitional portion of the image is blended such that there is a smooth change in resolution from the inner boundary at the first resolution to the outer boundary at the second resolution, the smooth change corresponding to a change in resolution between the fovea region and the non-fovea region. The controller generates an inset region using the HR inset portion of the image and the blended transitional portion of the image, and generates a background region using the downsampled peripheral portion. The controller provides, for display, the inset region to the HR inset display and the background region to the peripheral display on the HMD.

The compound display assembly may be configured to generate composite content having a fixed inset region or a steered inset region. A fixed inset region is an inset region that is fixed in relation to the background region. A steered inset region is an inset region having a position that may be varied in composite content. In a steered inset region configuration, the compound display assembly 160 also includes an eye tracking unit that tracks gaze direction of a viewing user and uses a steering element to adjust the position of the inset region in the generated composite content such that it is centered on the gaze direction. As the gaze direction changes, the compound display assembly 160 steers the inset region to keep it centered on the gaze direction. This is done in concert with the controller which ensures that the composite image is generated for the current location of the HR inset display.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
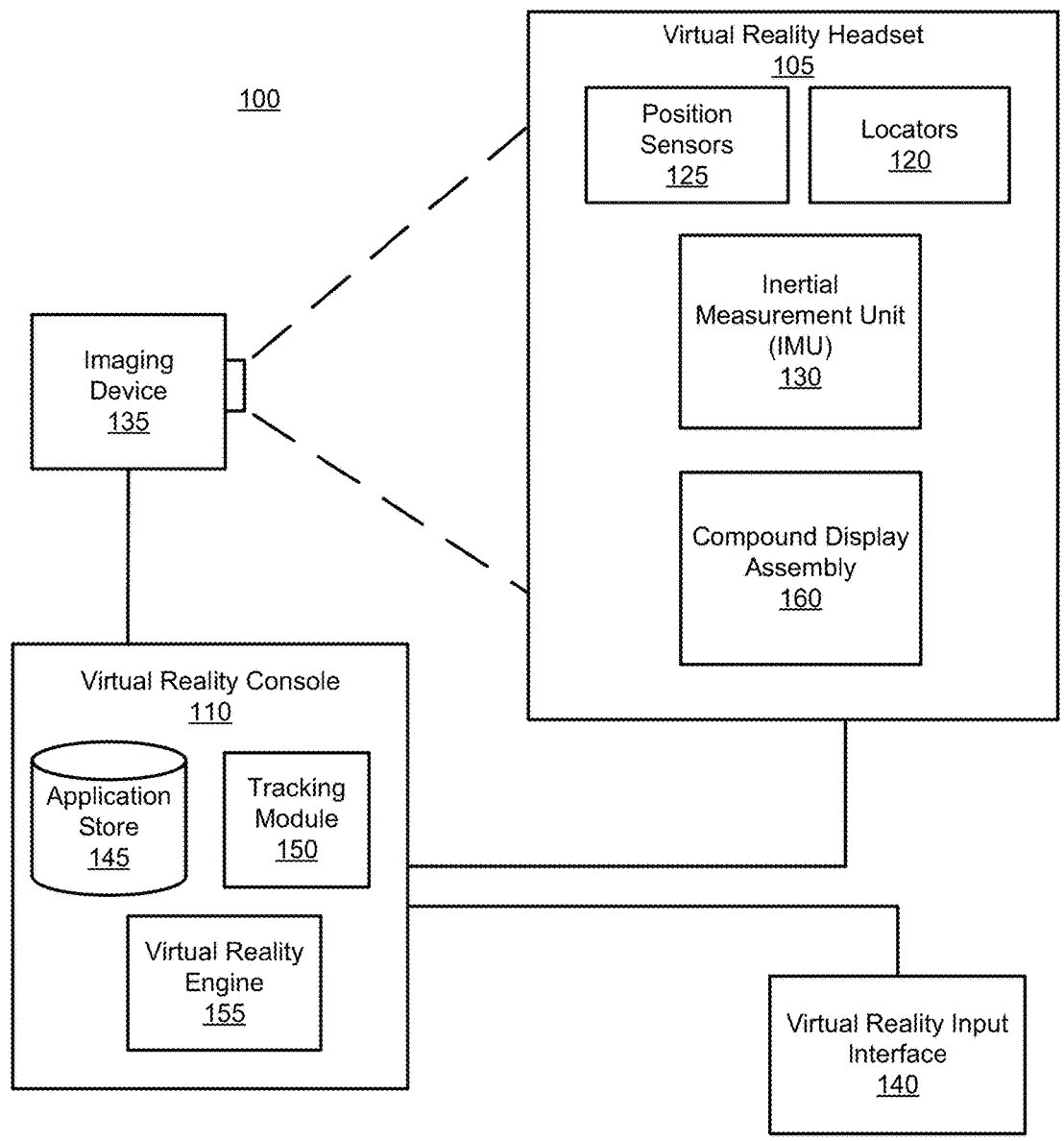
FIG. 1 is a diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example VR system environment 100 including one VR headset 105, one imaging device 135, and one VR input interface 140, in other embodiments any number of these components may be included in the VR system environment 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the VR system environment 100. Similarly, functionality of one or more of the components may be distributed among the components in a different manner than is described here. For example, some or all of the functionality of the VR console 110 may be contained within the VR headset 105.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. Some embodiments of the VR headset 105 are further described below in conjunction with FIGS. 2A-2B, 3-6. The VR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. When the VR headset acts as an AR headset, the VR headset 105 augments views and of a physical, real-world environment with computer-generated elements (e.g., images, video, sound, etc.).

The VR headset 105 includes a compound display assembly 160, one or more locators 120, one or more position sensors 125 and an inertial measurement unit (IMU) 130. Some embodiments of the VR headset 105 have different components than those described here. Similarly, the functionality of various components may be distributed among other components in the VR system environment 100 in a different manner than is described here in various embodiments. For example, some of the functions of the compound display assembly 160 may be performed by the VR console 110.

The compound display assembly 160 displays an image that is at a retinal resolution. Retinal resolution is defined as a composite image with variable resolution that matches or exceeds a resolution of a retina of a human eye. The compound display assembly 160 combines two or more images at different resolutions to generate composite content at retinal resolution. Composite content includes an inset region and a background region. The inset region is a portion of the composite content that has a resolution on the order of a fovea region of a retina of a human eye. The inset region includes a HR inset portion and a transitional portion. The HR inset portion is at a resolution corresponding to a fovea region of a human eye. In alternate embodiments, the HR inset portion of the image is at a resolution higher than the background region, but less than the resolution corresponding to the fovea region of the human eye. The transitional region surrounds the HR inset portion, and has a variable resolution that facilitates a seamless blending of the inset region with the background region. The variable resolution is such that it generally matches a transition found in the human eye between the fovea region and the non-fovea region of the retina. The background region of composite content surrounds some or all of the inset region, and is at a resolution generally on the order of a non-fovea region of the retina.

The compound display assembly 160 includes a HR inset display and a peripheral display. The HR inset display displays the inset region. The HR inset display displays the HR inset portion of the inset region at a resolution higher than the peripheral display, and is on the order of a human eye's visual acuity within the fovea region of the retina. The HR inset display displays the transitional region with a smoothly varying resolution. In contrast, the peripheral display displays the background region at a low resolution that is on the order of a human eye's visual acuity outside a fovea region of the retina. The compound display assembly 160 includes various optics which combine the inset region and the background region to generate composite content for presentation to a viewing user.

In some embodiments, the compound display assembly 160 receives an image at a particular resolution. The resolution may be, e.g., at least the resolution of the inset region display. The image is divided into a HR inset portion, a transitional portion, and a peripheral portion. The compound display assembly 160 may adjust a resolution of the HR inset portion of the image for presentation via the HR inset display. Additionally, the compound display assembly 160 adjusts a resolution of the peripheral portion of the image for presentation via the peripheral display. The compound display assembly 160 adjusts the resolution of the transitional portion such that it blends the inset portion and the peripheral portion. This would allow the peripheral display to be a uniform low resolution display with a resolution on the order of a non-fovea region of the retina. In contrast, in alternate embodiments some of the transitional region is presented using the peripheral display, accordingly, the peripheral display may have a variable resolution that transitions the inset portion of the image to the peripheral portion of the image.

In some embodiments, the compound display assembly 160 is configured to generate composite content having a fixed inset region. A fixed inset region is an inset region that is fixed in relation to the background region. A viewing user tends to look towards a center of displayed content. In some embodiments, the fixed inset region is fixed at the center of the background region.

In other embodiments, the compound display assembly 160 is configured to generate composite content having a steered inset region. A steered inset region is an inset region having a position that may be varied in composite content. The compound display assembly 160 may include an eye tracking unit that tracks gaze direction of a viewing user, and may use, e.g., a steering mirror to adjust a position of an inset region in the generated composite content such that it is centered on the gaze direction. As the gaze direction changes, the compound display assembly 160 steers the inset region to keep it centered on the gaze direction. Operation of the compound display assembly 160 is discussed in detail below with regard to FIGS. 2-9C.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1700 nm), in the ultraviolet band (10 nm to 380 nm), in some other portion of the electromagnetic spectrum, or in some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space, in practice the reference point is often defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start an application, to end an application, or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 provides haptic feedback to the user in accordance with instructions received from the VR console 110. For example, haptic feedback is provided when an action request is received or when the VR input interface 140 receives instructions from the VR console 110 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among modules of the VR console 110 in a different manner than described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface device 140. Examples of applications include: gaming applications, conferencing applications, video playback application, or other suitable applications.

The tracking module 150 calibrates the VR system environment 100 using one or more calibration parameters and may adjust one or more calibration parameters to reduce error in determining of the position of the VR headset 105 or of the VR input device 140. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120 on the VR headset 105), the tracking module 150 re-calibrates some or all of the VR system environment 100.

The tracking module 150 tracks movements of the VR headset 105 using slow calibration information from the imaging device 135. For example, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the VR headset 105. The tracking module 150 provides the estimated or predicted future position of the VR headset 105 to the VR engine 155.

The VR engine 155 executes applications within the VR system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
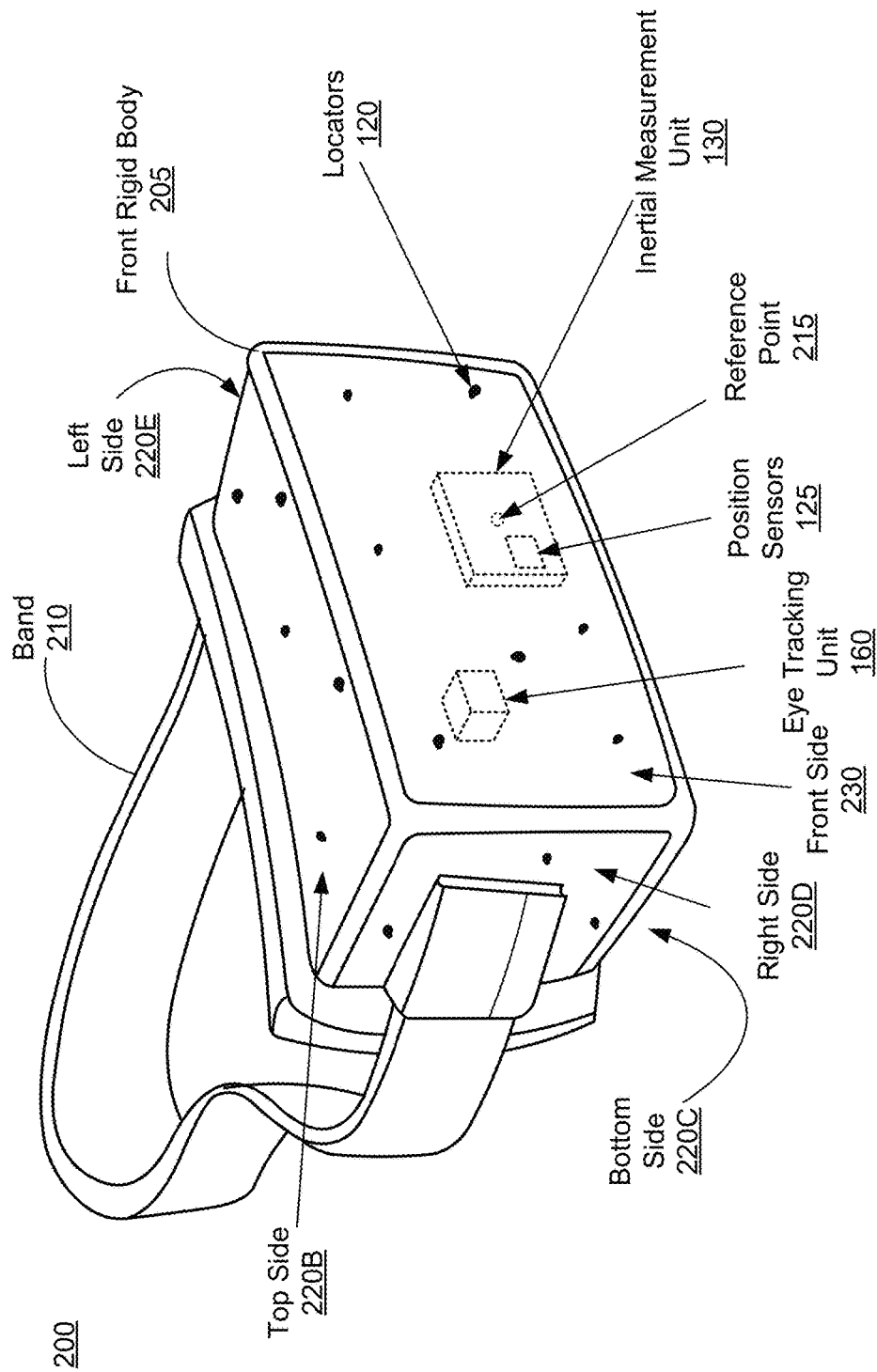
FIG. 2A is a diagram of a virtual reality headset, in accordance with an embodiment.

FIG. 2A is a diagram of a virtual reality (VR) headset, in accordance with an embodiment. The VR headset 200 is an embodiment of the VR headset 105, and includes a front rigid body 205 and a band 210. The front rigid body 205 includes an electronic display element of the electronic display 115 (not shown in FIG. 2), the optics block 118 (not shown in FIG. 2), the IMU 130, the one or more position sensors 125, an eye tracking unit 160 (not shown in FIG. 2), and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. The locators 120, or portions of the locators 120, are located on a front side 220A, a top side 220B, a bottom side 220C, a right side 220D, and a left side 220E of the front rigid body 205 in the example of FIG. 2.

Figure 2B:
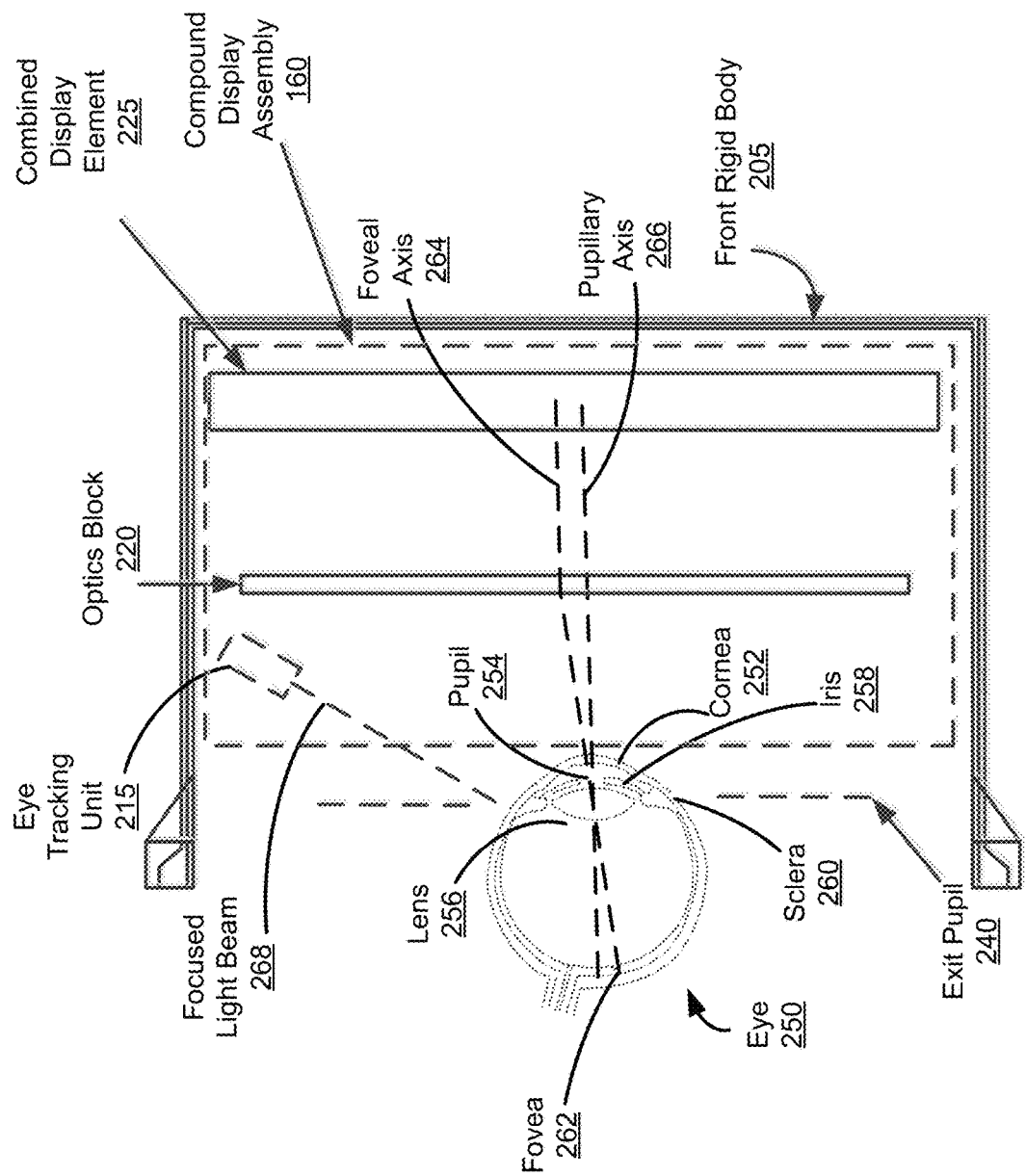
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. The FIG. 2B shows a compound display assembly 160 that includes the optics block 220, a combined display element 225. The compound display assembly 160 emits image light toward the optics block 220. The optics block 220 combines the image light, and in some embodiments, magnifies the image light and/or corrects for one or more additional optical errors (e.g., distortion, astigmatism, etc.). The optics block 220 directs the image light to an exit pupil 240 for presentation to the user. The exit pupil 240 is the location of the front rigid body 205 where a user's eye 250 is positioned.

Additionally, in some embodiments, the compound display includes an eye tracking unit 215. The eye tracking unit 215 tracks eye movement of the eye 250. For purposes of illustration, FIG. 2B shows a cross section 225 associated with a single eye 250, accordingly, a separate optics block 220 and/or combined display 225 may be used to provide altered image light to other eye of the user. Similarly, a separate eye tracking unit 215 may be used to track eye movement of the other eye of the user.

The eye 250 includes a cornea 252, a pupil 254, a lens 256, an iris 258, a sclera 260, and a fovea 262. The fovea 262 is illustrated as a small indent on the retina. The fovea 262 corresponds to the area of retina which has the highest visual acuity. The angular orientation of the eye corresponds to a direction of the user's gaze within the VR headset 105 and is defined herein as the direction of a foveal axis 264, which is the axis between a fovea of the eye and a center of the eye's pupil 254. In general, when a user's eyes are fixed on a point, the foveal axes of the user's eyes intersect that point. The eye also includes a pupillary axis 266, which is the axis passing through the center of the pupil 254, which is perpendicular to the corneal surface 252. In some embodiments, the eye tracking unit 215 detects an orientation of the pupillary axis and estimates the foveal axis based on the detected pupillary axis. Alternately, the eye tracking unit 215 estimates the foveal axis by directly detecting a location of the fovea or of other features of the eye's retina.

Figure 3:
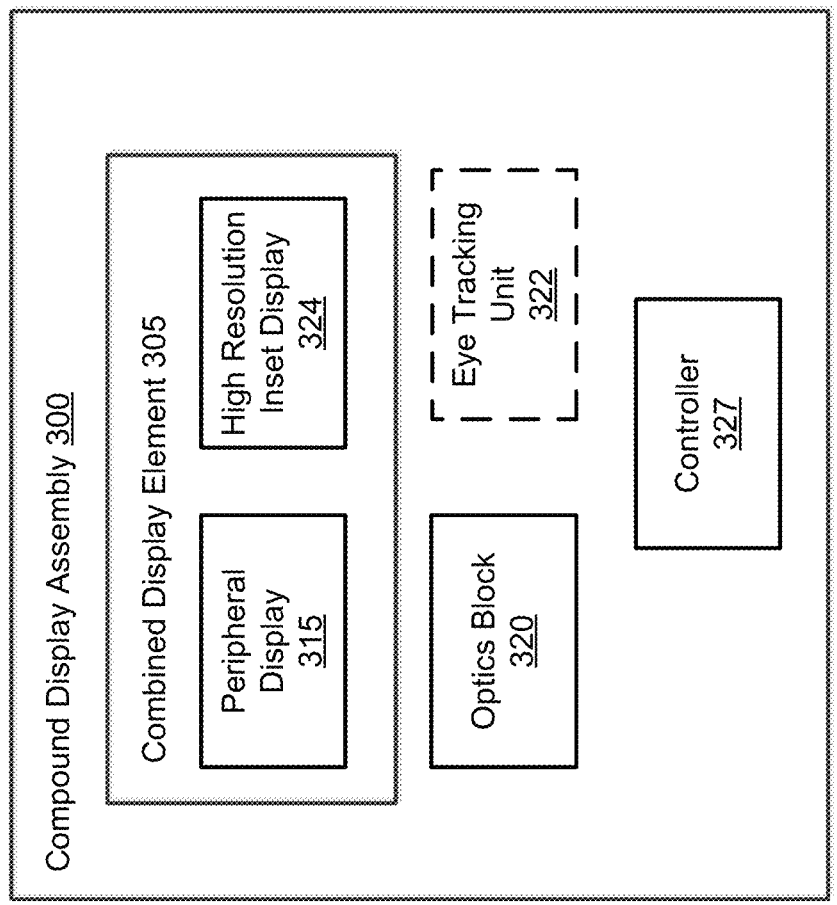
FIG. 3 is a high-level block diagram illustrating a detailed view of modules within a compound display assembly, in accordance with an embodiment.

FIG. 3 is a high-level block diagram illustrating a detailed view of modules within a compound display assembly 300, in accordance with an embodiment. In some embodiments, the compound display assembly 300 is a component (e.g., compound display assembly 160) of the VR headset 105. In alternate embodiments, the compound display assembly 300 is part of some other HMD, or other system that generates images at retinal resolution.

The compound display assembly 300 includes a combined display element 305 that further includes at least one peripheral display 315 and one high resolution inset display 324, an optics block 320, a controller 327 and an optional eye tracking unit 322. The combined display element 305, the optics block 320, and the eye tracking unit 322 are substantially similar to the combined display element 225, the optics block 220, and the eye tracking unit 215, respectively.

The compound display assembly 300 displays composite content to the user (e.g., in accordance with data received from a VR console 110). Composite content includes an inset region and a background region. The inset region includes a HR inset portion of an image and a transitional portion of the image. The HR inset portion has resolution corresponding to a resolution of a fovea region of a human eye. The transitional portion surrounds the HR inset portion, and has a varying resolution that smoothly varies from resolution corresponding to the resolution of the fovea region to a resolution corresponding to a non-fovea region of the eye. The background region has a resolution corresponding to a non-fovea region of a human eye. In various embodiments, the compound display assembly 300 may comprise at least two electronic displays for each eye of a user, for example a peripheral display 315 and a high resolution (HR) inset display 324. Examples of the electronic displays include: a liquid crystal display (LCD), an organic light emitting diode (OLED) display, an active-matrix organic light-emitting diode display (AMOLED), some other display, or some combination thereof.

The peripheral display 315 displays a background region of composite content. The peripheral display 315 receives the background region from the controller 327. In some embodiments, the peripheral display 315 may support displaying only low resolution content (e.g., it may be relatively low resolution display). In some embodiments, the peripheral display 315 may support displaying content at high as well as low resolution content.

The HR inset display 324 displays the inset region portion of the composite content. The HR inset display 324 has at least a resolution capable of displaying the HR inset portion of the image at its full resolution. Along the periphery of the inset region the HR inset display displays the transitional portion of the image with the varying resolution. The HR inset display 324 receives the inset portion from the controller 327.

In some embodiments, the optical properties of the HR inset 324 and peripheral display 315 are "well matched." For example, a virtual image distance of the HR inset 324 and peripheral display 315 are with a threshold distance from each other. The threshold distance is determined by an amount of dioptric separation. The HR inset 324 and peripheral display 315 are also well matched in the sense that one or more aberrations (e.g., field curvature, astigmatism, longitudinal chromatic aberration, etc.) for both displays are within a threshold amount. If the HR inset 324 and peripheral display 315 are not well matched, it may impede matching the virtual image distance for the HR inset 324 and peripheral display 315 when the inset is steered over the field of view.

In some embodiments, an eye tracking unit 322 is included in the compound display assembly 300. The eye tracking unit 322 determines an eye's position, including orientation and location of the eye including the location of the foveal axis of the eye relative to the combined display element 305. An eye tracking unit 322 may include an imaging system to image one or both eyes and may optionally include a light emitter, which generates light that is directed towards an eye so light reflected by the eye may be captured by the imaging system. For example, the eye tracking unit 322 includes a coherent light source emitting light in the visible spectrum or infrared spectrum as well as a camera capturing reflections of the emitted light by the user's eye. As another example, the eye tracking unit 322 captures reflections of radio waves emitted by a miniature radar unit. The eye tracking unit 322 uses low-power light emitters that emit light at frequencies and intensities that do not injure the eye or cause physical discomfort. In various other embodiments, the eye tracking unit 322 measures electromagnetic energy reflected by the eye and communicates the measured electromagnetic energy to the eye tracking unit 322, which determines the eye's position based on the measured electromagnetic energy.

In some embodiments, the compound display assembly 300 is configured to generate composite content having a fixed inset region. A fixed inset region is an inset region that is fixed in relation to the background region. The fixed inset region does not change its location with the movement of the eye. In some embodiments, the fixed inset region is located in an inset area located in a center of the background region (see e.g., FIG. 9A). In other embodiments, the fixed inset region is located at some other location (e.g., may be off-center). In these embodiments, the optics block 320 may also include an optical anti-aliasing filter. The optical anti-aliasing filter is an optical element that optically blurs the background region of the composite content. This helps remove digital artifacts due to the nature of the display and make the blur of the background region more natural.

The optics block 320 combines the content from the peripheral display 315 and the HR inset display 324 to form a composite content at retinal resolution. The optics block 320 may include a directing optical element such as a beam splitter. The directing optical element combines image light (i.e., background region) from the peripheral display 315 and image light (i.e., inset region) from the HR inset display 324 to generate composite content. The optics block 320 directs the composite content towards an exit pupil of the compound display assembly 300.

Additionally, the optics block 320 may magnify the composite content or correct optical errors associated with the composite content, and the corrected composite content is presented to a user of the VR headset 105. In various embodiments, the optics block 320 includes one or more optical elements. Example optical elements include: a beam splitter, one or more mirrors, one or more steerable mirrors and/or lenses, Risley prisms, phase-only spatial light modulators, decentered lenses, an aperture, a Fresnel lens, a convex lens, a concave lens, a filter, or any other suitable optical element that affects the image light emitted from the combined display element 340. Moreover, the optics block 320 may include combinations of different optical elements. In some embodiments, one or more of the optical elements in the optics block 320 may have one or more coatings, such as partial reflectors or anti-reflective coatings.

The optics block 320 may include a steering element. A steering element is one or more optical elements that adjusts a location (e.g. angularly or spatially) of the inset region in the composite content. The steering element may be, e.g., a steerable mirror. In other embodiments, the steering element may include Risley prisms, phase-only spatial light modulators, decentered lenses, or some combination thereof. The steering element adjusts a position of the inset region in the composite content in accordance with steering instructions from the controller 327.

Magnification of image light by the optics block 320 allows the combined display element 340 to be physically smaller, weigh less, and consume less power than larger displays. Additionally, magnification may increase a field of view of displayed composite content. For example, the field of view of the displayed composite content is such that the displayed content is presented using almost all (e.g., 110° diagonal), and in some cases all, of the user's field of view.

The optics block 320 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the combined display element 340 for display is pre-distorted, and the optics block 320 corrects the distortion when it receives image light from the combined display element 340 generated based on the content.

The controller 327 divides an image (or series of images) into an HR inset portion, a transitional portion, and a peripheral portion. In some embodiments, the controller 327 adjusts the resolution (e.g., upsample or downsample) of the HR inset portion such that it corresponds to a target resolution of an inset region. The target resolution is a resolution corresponding to a fovea region of a human eye. In some embodiments, the target resolution may be a resolution of the HR inset display 324. In some embodiments, the resolution of the HR inset portion is at the resolution of the HR inset display 324 so no adjustment is needed. The resulting content corresponds to the inset region of the composite content. Likewise, in some embodiments, the controller 327 adjusts (e.g., downsamples) the resolution of the peripheral portion such that it corresponds to the resolution of a background region of the composite content (e.g., may be a resolution of the peripheral display 315). The resulting content corresponds to the background region of the composite content.

The controller 327 applies a blending function to adjust the resolution of transitional portion such that the resolution smoothly transitions from a resolution of the HR inset portion of the image to the resolution of the background region. The blending function corresponds to the fall off in acuity associated with a transition from a fovea to a non-fovea region of a human eye. The blending function may be, for example, a Gaussian pyramid decomposition function, a Gaussian blending function, some function that smoothly transitions from the resolution of the inset region to the resolution of the background region, or some combination thereof. Additionally, the pyramid blending function may include performing a Gaussian pyramid decomposition, i.e., smoothen the content with an appropriate smoothing filter and then subsample the smoothed content and continue the process for a predetermined level of sampling density. The sub sampled and smoothened content is blended to the original content using a Gaussian blending function. The blended transitional portion corresponds to the transitional region of the composite content.

The controller 327 may also fade (e.g. the light is reduced in the section of the resulting image) the peripheral portion and/or the transitional portion using an intensity fading function. The content may include regions that have variable amounts of fading. Each region is termed as a fading region. The boundary of a fading region is determined using a size of the inset region. In some embodiments, the intensity fading function is applied to the image that causes an inset area in the background region to fade to black. And similarly, a different intensity fading function may be applied to some of the transitional portion of the image that surrounds the HR inset portion of the image.

The controller 327 provides, for display, the inset region to the HR inset display 324. The controller 327 also provides, for display, the background region to the peripheral display 315.

In some embodiments, the controller 327 receives information related to movement of the eye from an eye tracking unit 322. Based on the information related to the movement of the eye, the controller 327 determines a gaze direction of a user and a corresponding location of a fovea region of the eye of the user. The gaze direction corresponds to the foveal axis discussed above with regard to FIG. 2B. The controller 327 generates steering instructions for a steering element to adjust a position of the inset region such that it stays centered on the determined gaze direction. In such embodiments, the controller 327 also dynamically generates and/or adjusts the inset region and/or the background region to account for the moving location of the inset region.

In some embodiments, an output of a graphics card of the compound display assembly 300 renders with spatially varying resolution based in part on the determined gaze direction. For example the rendered content would include a HR portion corresponding to the gaze location, and a peripheral-low resolution portion. In some embodiments, the peripheral-low resolution portion includes a transitional area that blends the low resolution content with the high resolution content. In alternate embodiments, the HR portion is enclosed by the transitional area. The controller 327 then separates the rendered content into the HR portion for the HR inset display 324 and the peripheral-low resolution portion for the peripheral display 315, and provides the HR portion to the HR inset display 324 and the peripheral-low resolution portion to the peripheral display 315. In this manner, rendering at full resolution and downsampling is avoided, which would be unnecessary and potentially computationally wasteful.

In the above embodiments, the transitional region is part of the inset region. In alternate embodiments, the compound display assembly 300 is modified such that the transitional portion of the image is part of the background region. In these embodiments, the inset region is composed of the HR inset portion of the image, and the background region is composed of the downsampled peripheral region that surrounds a blended transitional region. In such embodiments, the peripheral display 315 is capable of displaying images at a resolution of at least that of the HR inset portion.

Figures 4A, 4B:
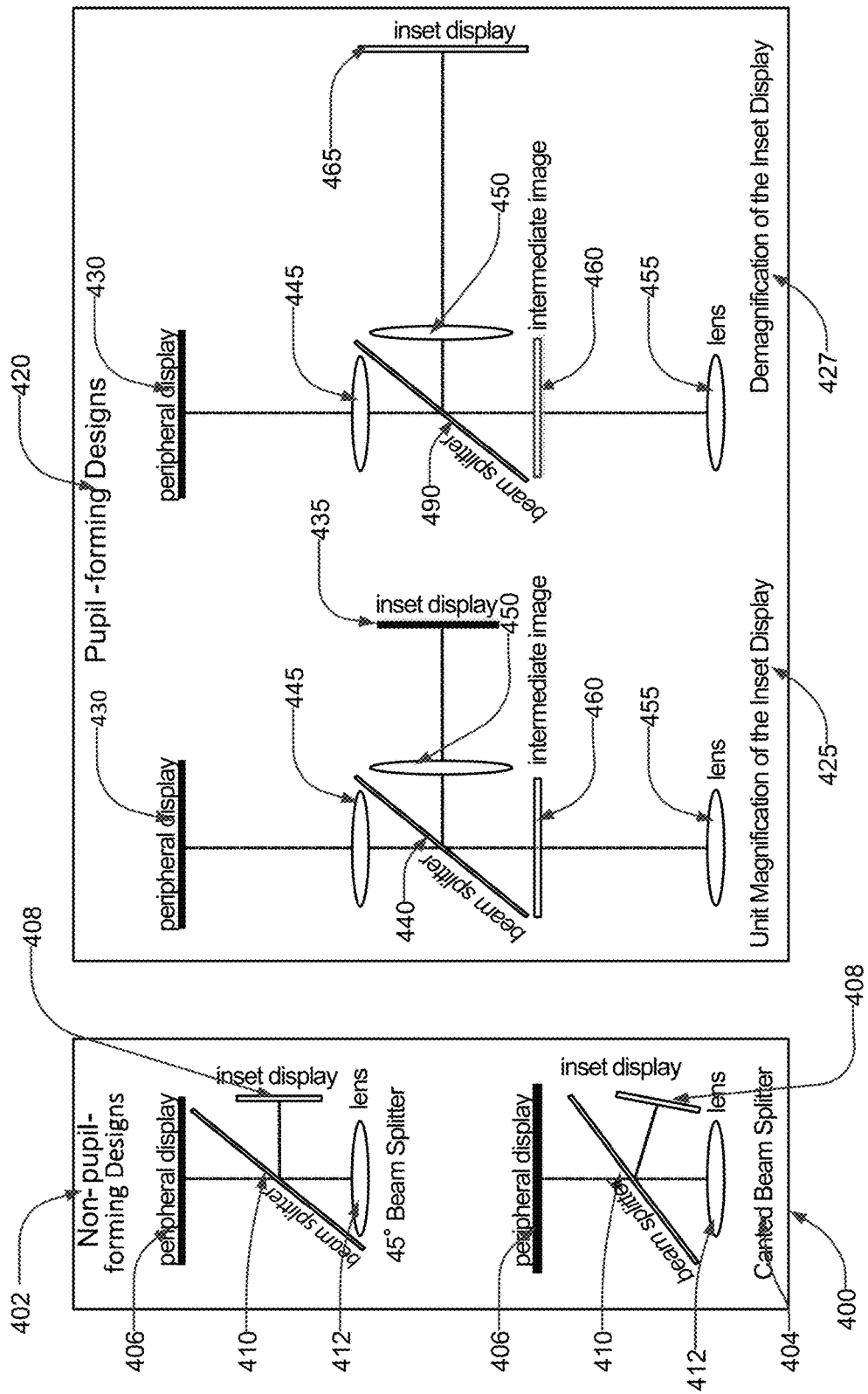
FIG. 4A are example non-pupil forming designs of a compound display configured to generate composite content having a fixed inset region, in accordance with an embodiment.
FIG. 4B are example pupil forming designs of a compound display configured to generate composite content having a fixed inset region, in accordance with an embodiment.

FIG. 4A are example non-pupil forming designs 400 of a compound display assembly configured to generate composite content having a fixed inset region, in accordance with an embodiment. The non-pupil forming design 400 includes a design 402 having a 45 degree beam splitter and a design 404 with a canted beam splitter. The design 402 includes a peripheral display 406, a HR inset display 408, a beam splitter 410, and an optical element 412 (e.g., a positive lens).

The peripheral display 406 emits light corresponding to a background region (and possibly some or all of a transitional region) of composite content. The HR inset display 408 emits light corresponding to an inset region of the composite content. The light from the peripheral display 406 and the HR inset display 408 is combined using a directing optic (i.e., the beam splitter 410) to generate a composite image that includes an inset region and a background region.

The design 404 is substantially similar to the design 402, except the beam splitter 410 is canted such that its normal is not 45 degrees from the light received from the peripheral display 406 and the light received from the HR inset display 408 By having an angle different than 45 degrees, the system may be smaller (smaller form factor) and lighter for the user.

FIG. 4B are example pupil forming designs 420 of a compound display assembly configured to generate composite content having a fixed inset region, in accordance with an embodiment. The pupil forming designs 420 include a unit-magnification design 425 and a de-magnified design 427.

The unit magnification design 425 includes a peripheral display 430, a HR inset display 435, a beam splitter 440, peripheral imaging lens 445, inset imaging lens 450, and an output lens 455. The emitted light from the peripheral display 430 is focused to an intermediate image point 460 by the peripheral lens 445 and the beam splitter 440. The emitted light from the HR inset display 435 is focused to the intermediate image point 460 by the inset imaging lens 450 and the beam splitter 440. In the design 425 the intermediate image is composite content, and is a unit magnification of a combination of the light emitted from the peripheral display 430 and the HR inset display 435. The output lens 455 outputs the composite content toward, e.g., an exit pupil of the design 425.

The design 427 is substantially similar to the design 425, except the HR inset display 435 is replaced with a large inset display 465, and the inset lens 450 is configured to de-magnify the light from the large inset region display 465 that is focused on the intermediate image point 460. The large inset display 465 may have a resolution lower than the HR inset display 435. The de-magnification of the large inset display 465 results in an apparent increase in resolution at the intermediate image point 460. In fact, composite content located at the intermediate image points 460 for both designs 425 may have equal resolution—even though the large inset display 465 has a lower resolution than the HR inset display 435.

One advantage of pupil forming designs 400 is that the generation of an intermediate image provides a longer path length from the peripheral and inset region displays to the exit pupil of a user. This allows insertion of optical elements to display a high quality composite image at the exit pupil. The additional number of lenses may provide for optical correction as well.

The size of the inset region in the composite content is determined based on high level design rules that are determined based on the visual acuity of an eye. The acuity chart of a human eye and a variety of displays are explained in detail below with respect to FIG. 5.

Figure 5:
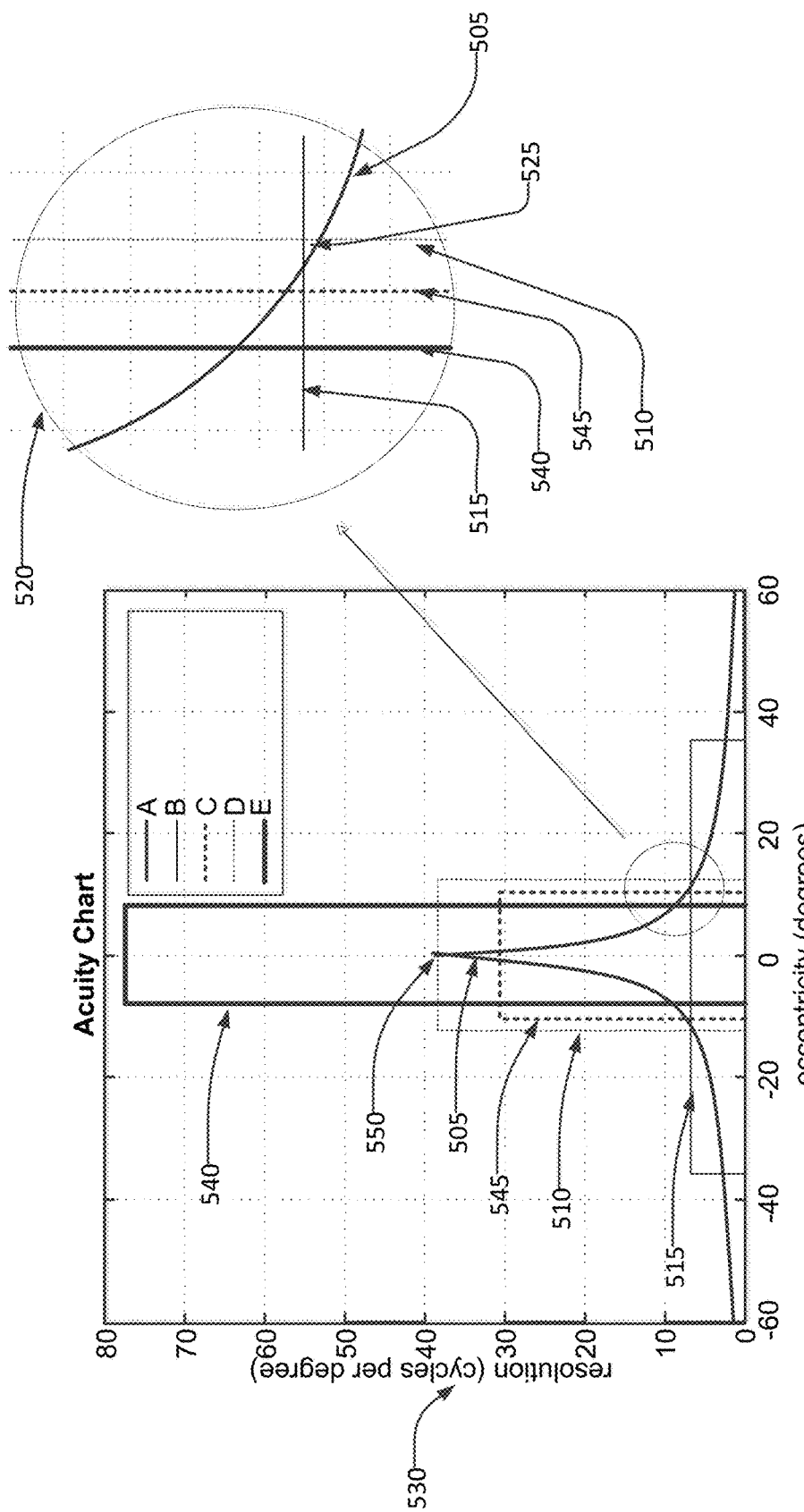
FIG. 5 illustrates the acuity for a human eye and various example displays in accordance with an embodiment.

FIG. 5 illustrates acuity for a human eye and various displays, in accordance with an embodiment. The acuity chart of FIG. 5 plots eccentricity 505 (i.e. field of view, of a human eye or a virtual display device) versus the resolution 510 of the content. The plot 515 is for visual acuity of a human eye. The resolution of content is at its peak at 0 degrees of eccentricity. This is the ideal field of view of a human eye, i.e. the visibility of content is the sharpest at this point. As the field of view moves away from the center by a few degrees, the resolution starts decreasing by a fair amount, i.e. the visibility of content is less sharp in this region (i.e. +/−20 degree eccentricity). As the field of view further moves away, i.e. around +/−40 degrees, +/−60 degrees, etc., the resolution drops sharply, i.e. the visibility of content starts fading out. The area around +/−20 degrees eccentricity for a visual acuity 505 curve is typically the fovea region of the human eye.

The plot 520 is for a display A, for example, an OLED based microdisplay device. The plot 520 is the closest to the visual acuity, i.e. produces high resolution content in the range of +20 to −20 degrees eccentricity. Based on the plot 520, the display A provides HR content (e.g. 38 cycles per degree) at a +/−10 degrees of eccentricity.

The plot 525 is for a display B. Based on the plot 525, the resolution of the content is low compared to other displays, for example, display A, display C, display D in the acuity chart. For example, the resolution of the plot 525 is 8 cycles per degree resolution, at 0 degrees of eccentricity. For a wide range of eccentricity +/−30 degrees, the resolution remains at around 8 cycles per degree. Based on this plot 525, the display B provides low resolution content.

A region 530 shows a zoomed in version of an intersection 535 of high resolution plot 540, plot 545, plot 520 and low resolution plot 525. From the zoomed in region 530, a resolution of the inset region design is designed to be in the region around the intersection 535 of the high resolution plot 520 and low resolution plot 525. The high resolution portion of the HR inset display is designed to be at least as high as or higher than the peak visual acuity point 550. Additionally, the peripheral portion, i.e. the low resolution portion in the background is supported by a peripheral display that has a resolution similar to the plot 525. A combined display with varying resolution exceeds human visual system as a function of eccentricity.

Figure 6A:
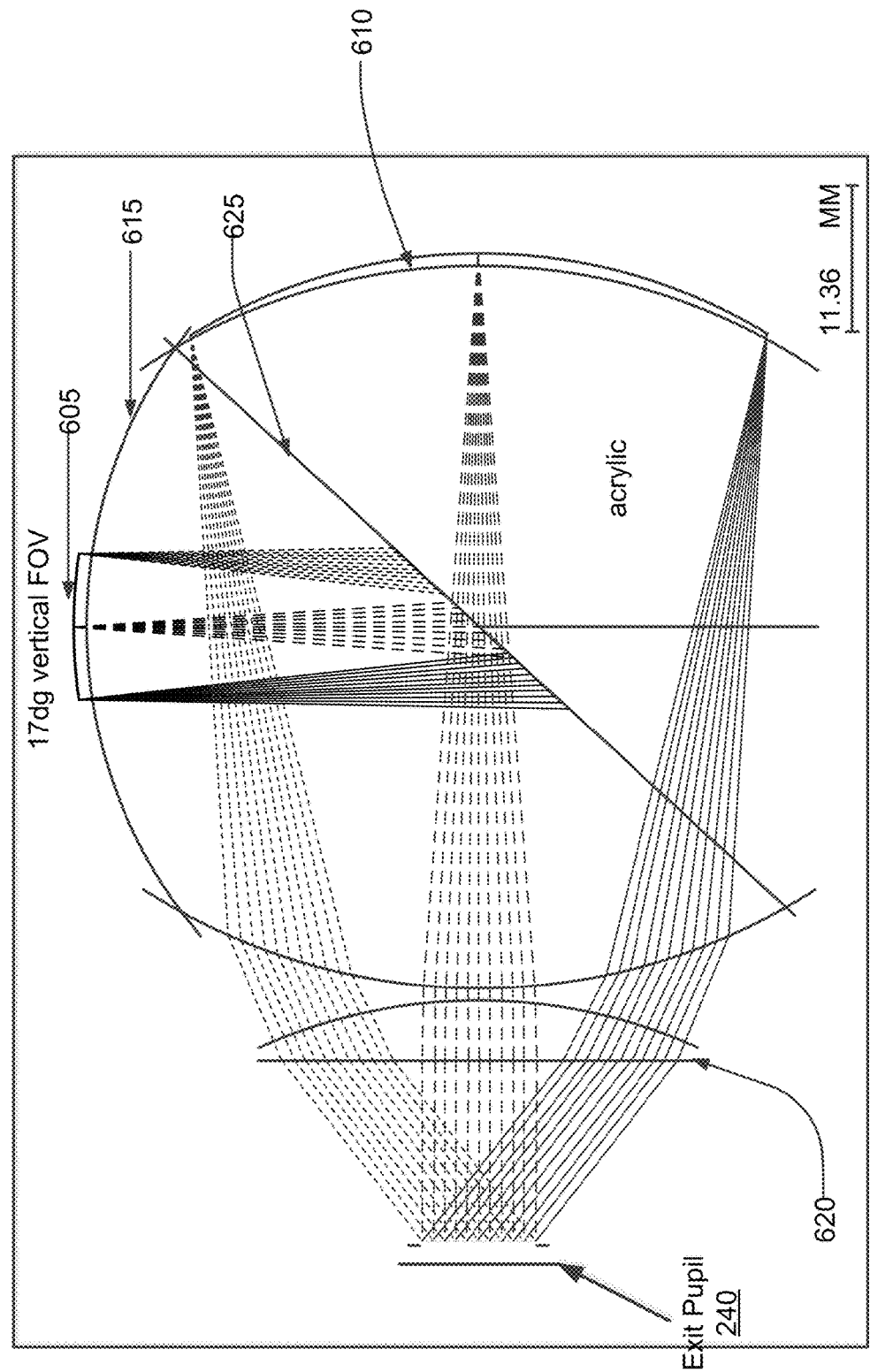
FIG. 6A is an example design of a compound display assembly configured to generate composite content having a fixed inset region, in accordance with an embodiment.

FIG. 6A is an example design 600 of a compound display assembly 602 configured to generate composite content having a fixed inset region, in accordance with an embodiment. The compound display assembly 602 is an embodiment of the compound display assembly 300 discussed above.

The design 600 includes a peripheral display 610, a HR inset display 605, and a ball structure 615, and an output lens 620. The peripheral display 610 is an embodiment of the peripheral display 315, and the HR inset display 605 is an embodiment of the HR inset display 324.

The ball structure 615 and the output lens 620 make up an optics block (e.g., the optics block 320). The ball structure 615 is a high index material (e.g., an acrylic) that includes a beam splitting interface 625. A high index material is a material with an index of refraction greater than 2. The peripheral display 610 is coupled to a curved surface of the ball structure 615. Similarly, the HR inset display 605 is coupled to a different curved surface of the ball structure 615.

In some embodiments, the peripheral display 610 and the HR inset region display 605 are curved displays. A curved display may mitigate field curvature, which is a form of optical distortion. In some embodiments, one or both of the peripheral display 610 and the HR inset display 605 are flat displays that are coupled to the curved surfaces of the ball structure 615 using respective fiber tapers.

Light from the peripheral display 610 and the HR inset display 605 are combined in the ball structure 615 to form composite content. The composite content is directed toward the output lens 620, which then directs the composite content towards an exit pupil 240. The light may pass through a baffling system before reaching the exit pupil.

Figure 6B:
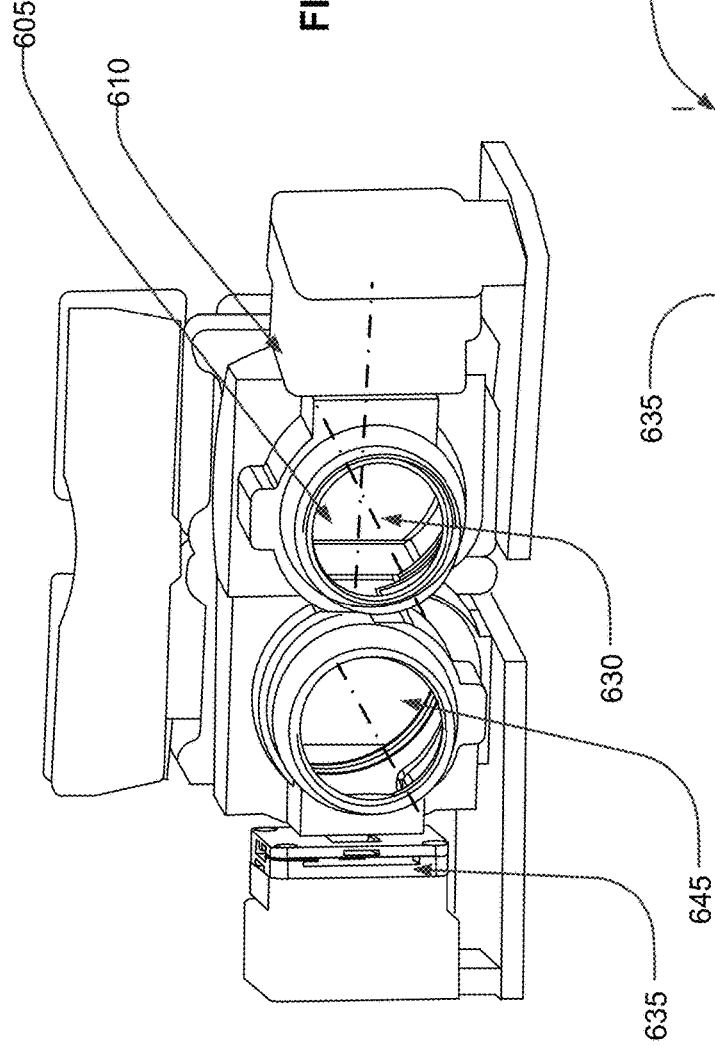
FIG. 6B is a perspective view of a compound display assembly configured to generate composite content having a fixed inset region, in accordance with an embodiment.

FIG. 6B is a perspective view of a compound display assembly 602, in accordance with an embodiment. The compound display assembly 602 is an embodiment of the compound display assembly 300 discussed above. The compound display assembly 602 is configured to present composite content. The compound display assembly 602 illustrates axes 630, peripheral displays 610, and HR inset displays 605. The axes 630 are configured to align within a fovea region of eyes of a user whose gaze location is at the center of the composite content—accordingly, the compound display assembly 602 is configured to provide a fixed inset region.

Figure 6C:
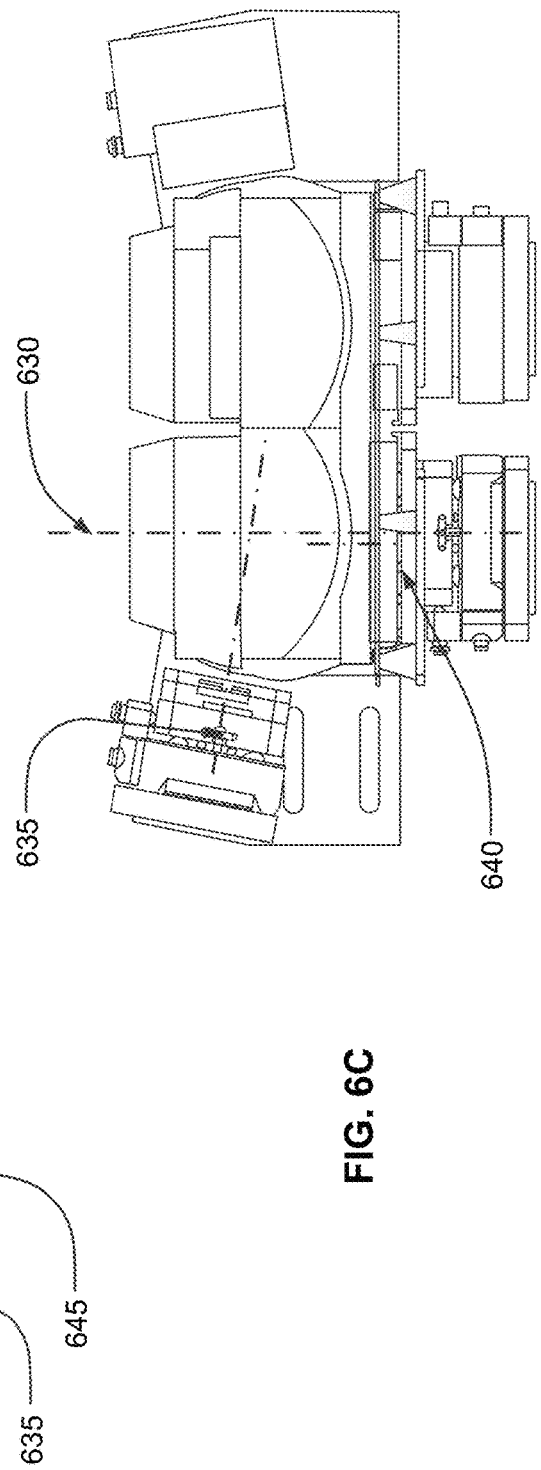
FIG. 6C is a top view of the compound display assembly shown in FIG. 6B, in accordance with an embodiment.

FIG. 6C is a top view of the compound display assembly 602 shown in FIG. 6B, in accordance with an embodiment. The compound display assembly 600 illustrates the axes 630, the peripheral displays 610, the HR inset displays 605, and the ball structures 615.

Figure 7:
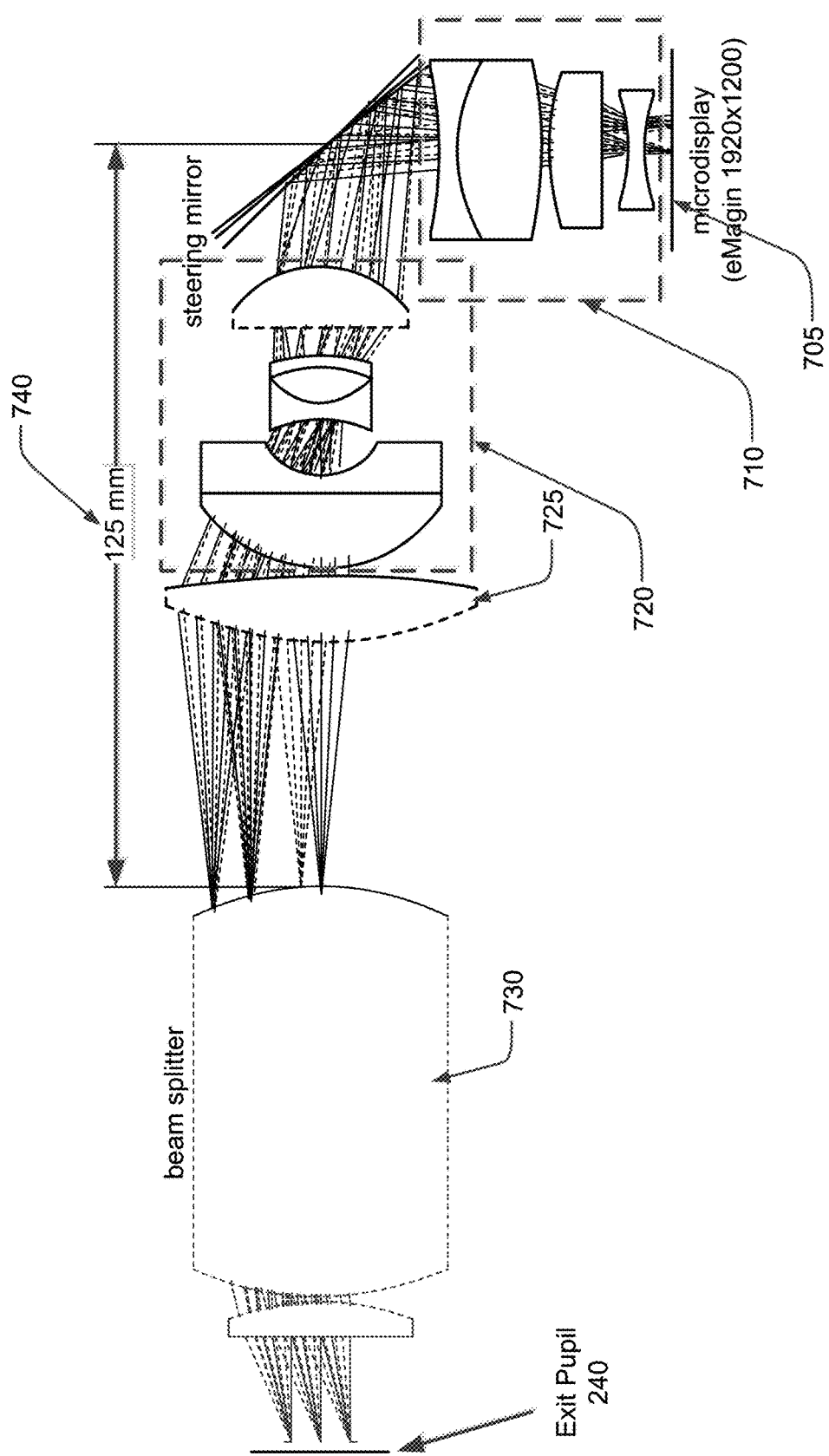
FIG. 7 is an example design of a compound display configured to generate a steered HR including a steered high resolution inset, in accordance with some embodiments.

FIG. 7 is an example design of a compound display assembly 700 configured to generate composite content including a steered high resolution inset, in accordance with some embodiments. The compound display assembly 700 is an embodiment of the compound display assembly 300 discussed above.

The compound display assembly 700 includes an inset region display 705, a group 710 of optical elements, a steering element 715, a group 720 of optical elements, a peripheral display 725 and a beam splitter 730.

The inset region display 705 emits light toward the group 710 of optical elements. The light is an inset portion of the composite content, and in some embodiments may include some or all of the transitional region of the composite content.

The group 710 of optical elements directs light from the inset region display 705 to the steering element 715. The group 710 includes a plurality of positive and negative lenses. The group of optical elements helps collimate the light to reduce the impact of the steering element changes as the beam moves around.

The steering element 715 moves the inset region portion in accordance with steering instructions from a controller (e.g., the controller 320). The steering instructions generally keep the inset region portion of composite content centered on a user's gaze location (i.e., aligned with a fovea region of an eye of the user). Examples of steering elements include a steering mirror, prisms, lenses, light modulators and other such elements. The steering element 715 has a large clear aperture, a fast response time (e.g. less than 10 milliseconds) and a fast settling time (e.g. less than 1 millisecond) and an accurate angular deviation (e.g. less than at least one pixel angular dimension over the emitted light duty-cycle to avoid perceiving the motion of the represented image). The response time is the time the steering element 715 takes to respond to a received change of movement. The settling time is the amount of time the steering element 715 takes to adjust to the new location after responding to the change of movement. A fast response time and fast settling time allow the steering element to move the inset region movement at the speed of the eye movement or faster. Similarly the accurate angular deviation is important to align the inset region portion at the location of the fovea region of the eye with the improved resolution limits.

The group 720 of optical elements direct the steered light toward the beam splitter 730 The peripheral display 725 emits light toward the beam splitter 730. The emitted light is the background region of the composite content and may include some or all of the transitional region of the composite content.

The beam splitter 730 combines the light from the group of optics 720 with the light from the peripheral display 725 to generate composite content. The output lens 735 then directs the composite content to an exit pupil 740. In one embodiment, the light may be directed through a baffling system.

Figure 8:
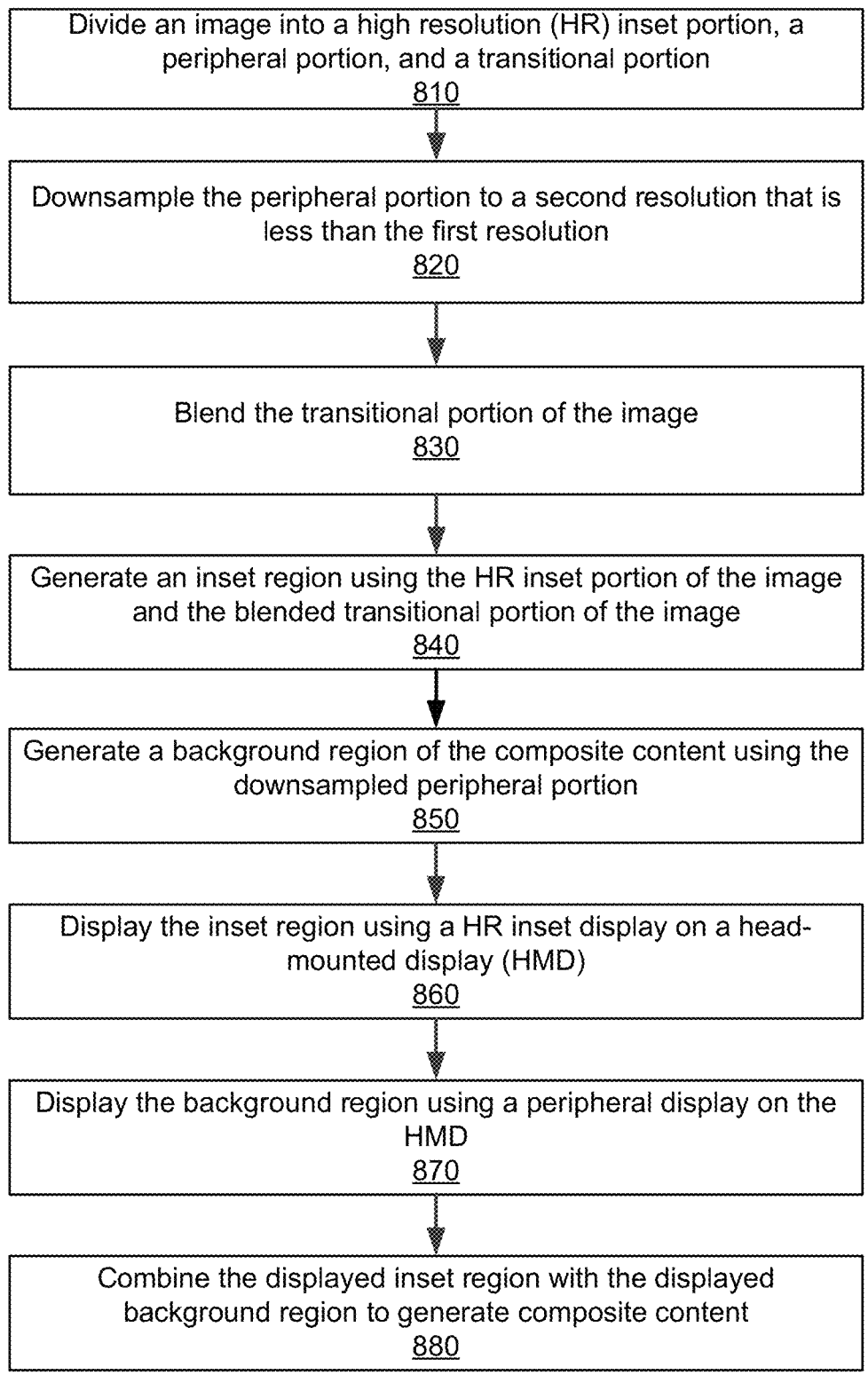
FIG. 8 is flowchart for generating an image at retinal resolution, in accordance with some embodiments.

FIG. 8 is flowchart for generating an image at retinal resolution, in accordance with some embodiments. The process 800 may be performed by the compound display assembly 800 in some embodiments. The compound display assembly 800 is an embodiment of the compound display assembly 300. Alternatively, other components may perform some or all of the steps of the process 800. For example, in some embodiments, a HMD and/or a VR console may perform some of the steps of the process 800. Additionally, the process 800 may include different or additional steps than those described in conjunction with FIG. 8 in some embodiments or perform steps in different orders than the order described in conjunction with FIG. 8.

The compound display assembly 800 divides 810 an image into a HR inset portion, a peripheral portion, and a transitional portion. The transitional portion is a portion of the image between the HR inset portion and the peripheral portion. In some embodiments, the image is at a first resolution that corresponds to a fovea region of a human eye. In other embodiments, the compound display assembly 800 adjusts (e.g., downsamples or upsamples) a resolution of the image to match the first resolution.

Figure 9B:
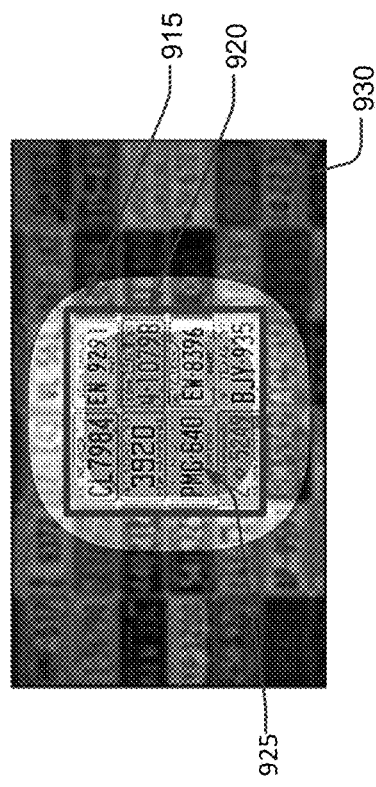
FIG. 9B illustrates a set of inset masks for changing a resolution of an image to display via a compound display assembly, in accordance with some embodiments.
Figure 9A:
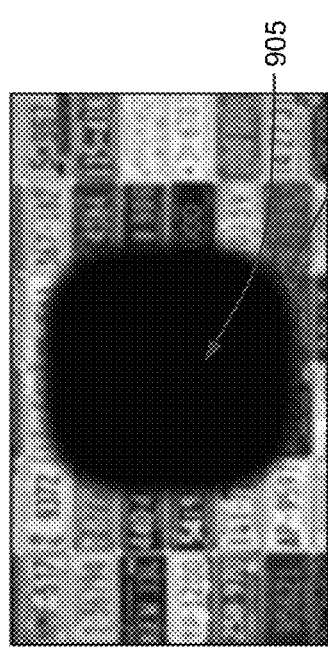
FIG. 9A illustrates a peripheral content of an image displayed via a compound display assembly, in accordance with some embodiments.

In embodiments, as part of the division, an intensity fading function is applied to the image that causes the inset portion and the transitional portion to fade to black, but not fade the peripheral portion of the image (see, e.g., FIG. 9A). And similarly, a different intensity fading function may be applied to some of the transitional portion of the image that surrounds the HR inset (see, e.g., FIG. 9B).

The compound display assembly 800 downsamples 820 the peripheral portion to a second resolution that is less than the first resolution. The second resolution corresponding to a non-fovea region of the human eye.

The compound display assembly 800 blends 830 the transitional portion of the image. The transitional portion has an inner boundary between the transitional portion and the HR inset portion and an outer boundary between the transitional portion and the peripheral portion. The blending is such that there is a smooth change in resolution from the inner boundary at the first resolution to the outer boundary at the second resolution. The smooth change corresponds to a change in resolution between the fovea region and the non-fovea region. The blending may be done using, e.g., a blending function. The blending function may, e.g., smooth the content with an appropriate smoothing filter and then subsample the smoothed content and continue the process for a predetermined level of sampling density. The content display assembly 800 then blends the sub sampled and smoothened content with the original content (e.g., using a Gaussian blending function).

The compound display assembly 800 generates 840 an inset region using the HR inset portion of the image and the blended transitional portion of the image. The inset region has a particular inset size that matches the outer boundary of the transitional portion of the image.

The compound display assembly 800 generates 850 a background region using the downsampled peripheral portion. The background region is generally the downsampled peripheral portion of the image. The background region includes an inset area that is the inset size. Note, in embodiments, where the compound display assembly 800 is configured to provide a steered inset, the location of the inset area in the background region varies to match a gaze direction of a user of the HMD. The gaze direction is determined based on a detected eye orientation from an eye tracking unit.

The compound display assembly 800 displays 860 the inset region using a HR inset display on a head-mounted display (HMD).

The compound display assembly 800 displays 870 the background region using a peripheral display on the HMD.

The compound display assembly 300 combines 880 the displayed inset region with the displayed background region to generate composite content. The combination of the inset region and the background region is done using an optics block. The inset region is inset into the inset area of the background region. The composite image is at retinal resolution. The composite content includes low resolution content (i.e., the background region) and high resolution content (i.e., the inset region) displayed in an inset of the low resolution content.

Note, in embodiments where the compound display assembly 800 is configured to operate as a fixed inset, the compound display assembly 300 may include an optical anti-aliasing filter that optically blurs some of the background region. This helps remove digital artifacts or blockiness and make the blur of the background region more natural.

Additionally, in some embodiments, the compound display assembly 800 calibrates color for the peripheral display and the inset display such that they both are within a threshold range of color values. As the peripheral display and the inset display are two separate displays, the color calibration matches color across the two sensors such that any color shift between the sensors is not detectable to a viewing user. In one embodiment, the color calibration may occur dynamically to account for variation in the beam splitter performance.

In some embodiments, the compound display calibrates luminance for the peripheral display and the inset display such that they both are within a threshold range of luminance values. Similar to color calibration, the luminance calibration matches luminance across the two sensors such that any luminance shift between the sensors is not detectable to a viewing user.

FIG. 9A illustrates a background region 900 of an image displayed via a peripheral display, in accordance with some embodiments. The background region 900 illustrates a low resolution portion 910 and an inset area 920. The low resolution portion 920 is at a low resolution generally corresponding to a resolution of a non-fovea region of a human eye. The inset area 920 is location where the inset region may be combined with the background region 900 to generate composite content.

FIG. 9B illustrates an inset region 930 of an image displayed via a HR inset display, in accordance with some embodiments. The inset region 900 includes a HR inset portion 940 of the image and a transitional portion 950 of the image. The HR inset portion 940 is at a resolution corresponding to a foveal region of a human eye. The HR inset portion 940 is surrounded by the transitional portion 950. The transitional portion 950 has in outer boundary 955 and an inner boundary 960. The transitional portion 950 is blended such that the resolution smoothly varies from the outer boundary at the resolution of the low resolution portion 910 discussed above, to the high resolution of the HR inset portion 940. Additionally, the transitional portion 950 may be faded to ensure that it combines correctly with the background portion 920.

Figure 9C:
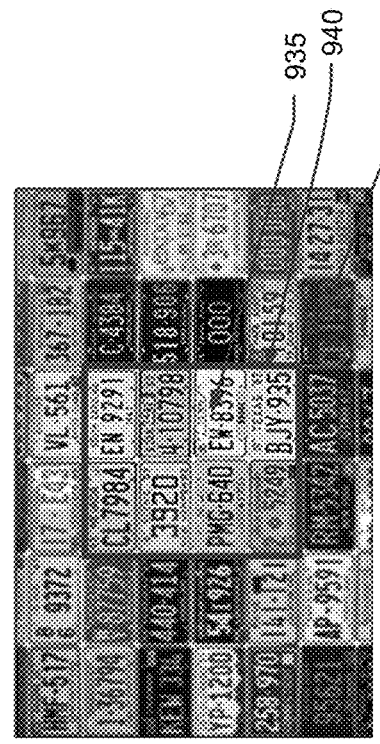
FIG. 9C illustrates composite content including variable resolutions displayed via a compound display assembly, in accordance with some embodiments.

FIG. 9C illustrates composite content 970 including variable resolutions displayed via a compound display assembly, in accordance with some embodiments. The composite image 955 includes the inset region 930 and the background region 900.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   dividing an image into a high resolution (HR) inset portion, a peripheral portion, and a transitional portion between the HR inset portion and the peripheral portion, wherein the image is at a first resolution corresponding to a resolution of a fovea region of a human eye, and the transitional portion has an inner boundary between the transitional portion and the HR inset portion and an outer boundary between the transitional portion and the peripheral portion;
   downsampling the peripheral portion to a second resolution that is less than the first resolution, the second resolution corresponding to a resolution of a non-fovea region of the human eye;
   blending the transitional portion of the image such that there is a smooth change in resolution from the inner boundary at the first resolution to the outer boundary at the second resolution, the smooth change corresponding to a change in resolution between the fovea region and the non-fovea region;
   generating an inset region using the HR inset portion of the image and the blended transitional portion of the image;
   generating a background region using the downsampled peripheral portion;
   providing, for display, the inset region to a HR inset display on a head-mounted display (HMD);
   providing, for display, the background region to a peripheral display on the HMD, and
   wherein an optics block combines the displayed inset region with the displayed background region to generate composite content.

2. The method of claim 1, wherein dividing an image into a high resolution (HR) inset portion, a peripheral portion, and a transitional portion between the HR inset portion and the peripheral portion, further comprises:
   applying a first fading function to the image that causes the inset portion and the transitional portion to fade to black, the faded image being the peripheral portion; and
   applying a second fading function to some of the transitional portion of the image that surrounds the HR inset.

3. The method of claim 1, wherein dividing an image into a high resolution (HR) inset portion, a peripheral portion, and a transitional portion between the HR inset portion and the peripheral portion is based in part on an eye orientation of a user of the HMD.

4. The method of claim 1, wherein blending the transitional portion of the image such that there is a smooth change in resolution from the inner boundary at the first resolution to the outer boundary at the second resolution, the smooth change corresponding to a change in resolution between the fovea region and the non-fovea region, comprises:
   applying a blurring function that blurs a portion of the transitional portion of the image.

5. The method of claim 1, wherein the background region that is displayed using the peripheral display passes through an optical anti-aliasing filter before being combined with the inset portion that is displayed using the HR inset display, the optical anti-aliasing filter optically blurring some of the background region.

6. The method of claim 1, further comprising:
   calibrating color for the peripheral display and the inset display such that they both are within a threshold range of color values.

7. The method of claim 1, further comprising:
   calibrating luminance for the peripheral display and the inset display such that they both are within a threshold range of luminance values.

8. The method of claim 1, wherein the composite image has variable resolution that matches a resolution of a retina of a human eye.

9. A non-transitory computer-readable storage medium storing executable computer program instructions, the instructions executable to perform steps comprising:
   dividing an image into a high resolution (HR) inset portion, a peripheral portion, and a transitional portion between the HR inset portion and the peripheral portion, wherein the image is at a first resolution corresponding to a resolution of a fovea region of a human eye, and the transitional portion has an inner boundary between the transitional portion and the HR inset portion and an outer boundary between the transitional portion and the peripheral portion;
   downsampling the peripheral portion to a second resolution that is less than the first resolution, the second resolution corresponding to a resolution of a non-fovea region of the human eye;
   blending the transitional portion of the image such that there is a smooth change in resolution from the inner boundary at the first resolution to the outer boundary at the second resolution, the smooth change corresponding to a change in resolution between the fovea region and the non-fovea region;
   generating an inset region using the HR inset portion of the image and the blended transitional portion of the image;
   generating a background region using the downsampled peripheral portion;
   providing, for display, the inset region to a HR inset display on a head-mounted display (HMD);
   providing, for display, the background region to a peripheral display on the HMD, and
   wherein an optics block combines the displayed inset region with the displayed background region to generate composite content.

10. The computer readable medium of claim 9, wherein dividing an image into a high resolution (HR) inset portion, a peripheral portion, and a transitional portion between the HR inset portion and the peripheral portion, further comprises:
    applying a first fading function to the image that causes the inset portion and the transitional portion to fade to black, the faded image being the peripheral portion; and
    applying a second fading function to some of the transitional portion of the image that surrounds the HR inset.

11. The computer readable medium of claim 9, wherein dividing an image into a high resolution (HR) inset portion, a peripheral portion, and a transitional portion between the HR inset portion and the peripheral portion is based in part on an eye orientation of a user of the HMD.

12. The computer readable medium of claim 9, wherein blending the transitional portion of the image such that there is a smooth change in resolution from the inner boundary at the first resolution to the outer boundary at the second resolution, the smooth change corresponding to a change in resolution between the fovea region and the non-fovea region, comprises:

applying a blurring function that blurs a portion of the transitional portion of the image.

13. The computer readable medium of claim 9, wherein the background region that is displayed using the peripheral display passes through an optical anti-aliasing filter before being combined with the inset portion that is displayed using the HR inset display, the optical anti-aliasing filter optically blurring some of the background region.

14. The computer readable medium of claim 9, further comprising:

calibrating color for the peripheral display and the inset display such that they both are within a threshold range of color values.

15. The computer readable medium of claim 9, further comprising:

calibrating luminance for the peripheral display and the inset display such that they both are within a threshold range of luminance values.

16. The computer readable medium of claim 9, wherein the composite image has variable resolution that matches a resolution of a retina of a human eye.

17. A head-mounted display (HMD) comprising:
a controller configured to:
divide an image into a high resolution (HR) inset portion, a peripheral portion, and a transitional portion between the HR inset portion and the peripheral portion, wherein the image is at a first resolution corresponding to a resolution of a fovea region of a human eye, and the transitional portion has an inner boundary between the transitional portion and the HR inset portion and an outer boundary between the transitional region and the peripheral portion,
downsample the peripheral portion to the second resolution, the second resolution corresponding to a resolution of a non-fovea region of the human eye,
blend the transitional portion of the image such that there is a smooth change in resolution from the inner boundary at the first resolution to the outer boundary at the second resolution, the smooth change corresponding to a change in resolution between the fovea region and a non-fovea region of the human eye,
generate an inset region using the HR inset portion of the image and the blended transitional portion of the image,
generate a background region using the downsampled peripheral portion; and
a high resolution (HR) inset display that is configured to display the inset region;
a peripheral display that is configured to display the background region;
an optics block configured to:
combine the inset region and the background region to create composite content, wherein the inset region is inset into the background region, and
direct the composite content to an exit pupil of the HMD corresponding to a location of an eye of a user of the HMD.

18. The HMD of claim 17, wherein the controller is further configured to:

apply a first fading function to the image that causes the inset portion and the transitional portion to fade to black, the faded image being the peripheral portion; and apply a second fading function to some of the transitional portion of the image that surrounds the HR inset.

19. The HMD of claim 17, further comprising:

an eye tracking unit configured to monitor an orientation of an eye of a user of the HMD, and wherein the controller is configured to divide an image into a high resolution (HR) inset portion, a peripheral portion, and a transitional portion between the HR inset portion and the peripheral portion based in part on the orientation of the eye.

20. The HMD of claim 17, wherein the controller is further configured to:

apply a blurring function that blurs a portion of the transitional portion of the image.

21. The HMD of claim 17, further comprising:

an optical anti-aliasing filter that optically blurs a portion of the background content.

22. The HMD of claim 17, wherein the composite image has variable resolution that matches a resolution of a retina of a human eye.

* * * * *